(12) United States Patent
Sun et al.

(10) Patent No.: US 11,906,977 B2
(45) Date of Patent: Feb. 20, 2024

(54) PATH PLANNING METHOD

(71) Applicant: SOOCHOW UNIVERSITY, Suzhou (CN)

(72) Inventors: Rongchuan Sun, Suzhou (CN); Junyi Wu, Suzhou (CN); Shumei Yu, Suzhou (CN); Guodong Chen, Suzhou (CN); Lining Sun, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 43 days.

(21) Appl. No.: 17/910,842

(22) PCT Filed: May 7, 2022

(86) PCT No.: PCT/CN2022/091415
§ 371 (c)(1),
(2) Date: Sep. 12, 2022

(87) PCT Pub. No.: WO2022/233332
PCT Pub. Date: Nov. 10, 2022

(65) Prior Publication Data
US 2023/0195134 A1 Jun. 22, 2023

(30) Foreign Application Priority Data
May 7, 2021 (CN) .......................... 202110494874.7

(51) Int. Cl.
*G05D 1/02* (2020.01)
*G05D 1/00* (2006.01)

(52) U.S. Cl.
CPC ......... *G05D 1/0274* (2013.01); *G05D 1/0221* (2013.01); *G05D 1/0253* (2013.01)

(58) Field of Classification Search
CPC ... G05D 1/0274; G05D 1/0221; G05D 1/0253
See application file for complete search history.

(56) References Cited

U.S. PATENT DOCUMENTS 7,467,115 B2 * 12/2008 Edelman .............. G05D 1/0246
706/15
10,175,662 B2 * 1/2019 Yu ........................... G05D 1/02
(Continued)

FOREIGN PATENT DOCUMENTS

CN 101701830 A * 5/2010
CN 106814737 A 6/2017
(Continued)

OTHER PUBLICATIONS

Xiaojun Jiang, "Research on the episodic cognitive mapping and robot navigation method based on the cognitive mechanism of rat hippocampus" Masteral Thesis, Beijing University of Technology (May 15, 2019).

*Primary Examiner* — Rachid Bendidi
(74) *Attorney, Agent, or Firm* — SZDC LAW P.C.

(57) ABSTRACT

The present invention discloses a path planning method, including the following steps: establishing an empirical map and a corresponding episodic cognitive map using a Rat-SLAM algorithm based on an episodic memory model; extracting a road edge in a historical memory image with a Canny operator; performing conversion to a world coordinate system from a pixel coordinate system based on the road edge, and preliminarily judging connectivity according to slope of the road edge; continuously injecting energy into the potential path detection network according to continuous observation of a potential path, so as to further judge the road connectivity; fusing the detected potential path and the original episodic cognitive map, and correspondingly updating the empirical map; and planning a path based on the updated episodic cognitive map. The potential safe path in an environment may be detected, and a better path may be planned based on the updated episodic memory model.

3 Claims, 6 Drawing Sheets

(56) References Cited

U.S. PATENT DOCUMENTS

| | | |
|---|---|---|
| 2006/0129506 A1 | 6/2006 | Edelman et al. |
| 2007/0100780 A1* | 5/2007 | Fleischer ............ G05B 13/027 |
| | | 706/15 |
| 2012/0239602 A1* | 9/2012 | Izhikevich ............ G06N 20/00 |
| | | 706/15 |
| 2018/0046153 A1 | 2/2018 | Yu et al. |

FOREIGN PATENT DOCUMENTS

| | | |
|---|---|---|
| CN | 106949896 A | 7/2017 |
| CN | 109668566 A | 4/2019 |
| CN | 113110492 A | 7/2021 |

* cited by examiner $$\begin{bmatrix} A & 0.9 & 0.81 & 0.729 & 0.6561 \\ 0.9 & B & 0.9 & 0.81 & 0.729 \\ 0.81 & 0.9 & C & 0.9 & 0.81 \\ 0.729 & 0.81 & 0.9 & D & 0.9 \\ 0.6561 & 0.729 & 0.81 & 0.9 & E \end{bmatrix}$$

$$\begin{bmatrix} A & 0.9 & 0.81 & 0.729 & 0.6561 \\ 0.9 & B & 0.9 & 0.81 & 0.9 \\ 0.81 & 0.9 & C & 0.9 & 0.81 \\ 0.729 & 0.81 & 0.9 & D & 0.9 \\ 0.6561 & 0.9 & 0.81 & 0.9 & E \end{bmatrix}$$

PATH PLANNING METHOD

This application is the National Stage Application of PCT/CN2022/091415, filed on May 7, 2022, which claims priority to Chinese Patent Application No. 202110494874.7, filed on May 7, 2021, which is incorporated by reference for all purposes as if fully set forth herein.

FIELD OF THE DISCLOSURE

The present invention pertains to the field of path planning of mobile robots, and particularly relates to an episodic memory path planning method based on memory fusion.

BACKGROUND OF THE DISCLOSURE

When a mobile robot models a strange environment in the environment, a safe path to a target is required to be planned to carry out related navigation tasks. Due to complexity of an actual environment in reality, an algorithm is required to have a certain capability of adapting to dynamic information in the environment, and a traditional path planning algorithm, such as an A* (A-Star) algorithm, an artificial potential field method, a rapidly-exploring random tree (RRT) algorithm, or the like, has a greatly limited performance, and has a non-ideal path planning effect in the complex environment. A path planned by the A* algorithm is not smooth enough, the artificial potential field method tends to fall into local optimum, and the RRT algorithm has a low searching efficiency, and cannot plan an optimal path.

Many living beings in nature can perform cognitive learning on the environment and efficiently complete navigation tasks in complex dynamic scenarios, and the special navigation capability of the living beings greatly improves interest of researchers in cognitive elicitation. Research shows that an episodic memory mechanism in the hippocampus plays a great role during path planning. In an environment cognition process, the hippocampus memorizes various scenarios experienced in the past; when a navigation task is given, an optimal path is planned by extracting memory fragments related to the task.

A path planning algorithm based on episodic memory may plan an optimal path based on an existing cognitive map, but this path planning method lacks understanding of the map, and the optimal path may not be shortest globally. In order to improve a navigation efficiency of the robot, the understanding of the cognitive map by the robot is required to be increased to explore a potential safe path in the environment. After the detected potential path is fused with the original map, a better path may be planned for the mobile robot.

Therefore, research on searching the potential safe path from the environment to perfect the cognitive map is of great significance to optimization of the path planned based on an episodic memory model.

SUMMARY OF THE DISCLOSURE

An object of the present invention is to provide a new episodic memory path planning method based on memory fusion, so as to plan a better path.

A path planning method, comprising the following steps:
establishing an empirical map and a corresponding episodic cognitive map using a RatSLAM algorithm based on an episodic memory model;
extracting a road edge in a historical memory image with a Canny operator;
performing conversion to a world coordinate system from a pixel coordinate system based on the road edge, and preliminarily judging connectivity according to slope of the road edge;
continuously injecting energy into the potential path detection network according to continuous observation of a potential path, so as to further judge the road connectivity;
fusing the detected potential path and the original episodic cognitive map, and correspondingly updating the empirical map; and
planning a path based on the updated episodic cognitive map,
wherein the episodic memory model is a path planning algorithm;
the episodic cognitive map is a two-dimensional incremental matrix and composed of a discrete limited event space and an event transition set;
the preliminarily judging connectivity according to slope of the road edge comprises: when an absolute value of a difference between the slope of the road edge is less than a set threshold, determining that there exists a possibility of connection between two points;
the potential path detection network has a two-dimensional network structure proposed under inspiration of a continuous attractor network in a RatSLAM model, and is configured to simulate a process of judging whether roads are connected by living things;
the updated episodic cognitive map is a new map obtained by correcting an event transition weight in the original episodic cognitive map according to the detected potential path.

According to the technical solution of the present invention, the potential safe path in an environment is searched using the potential path detection network, and compared with an original episodic memory model only containing a track of a mobile robot in the past time and space, the episodic memory model after the potential path detection network is fused may plan the better path for the mobile robot.

BRIEF DESCRIPTION OF DRAWINGS

The present invention is further described below with reference to the accompanying drawings and embodiments.

DETAILED DESCRIPTION OF PREFERRED EMBODIMENTS

The present disclosure is further described below with reference to the accompanying drawings and embodiments.

Figure 1:
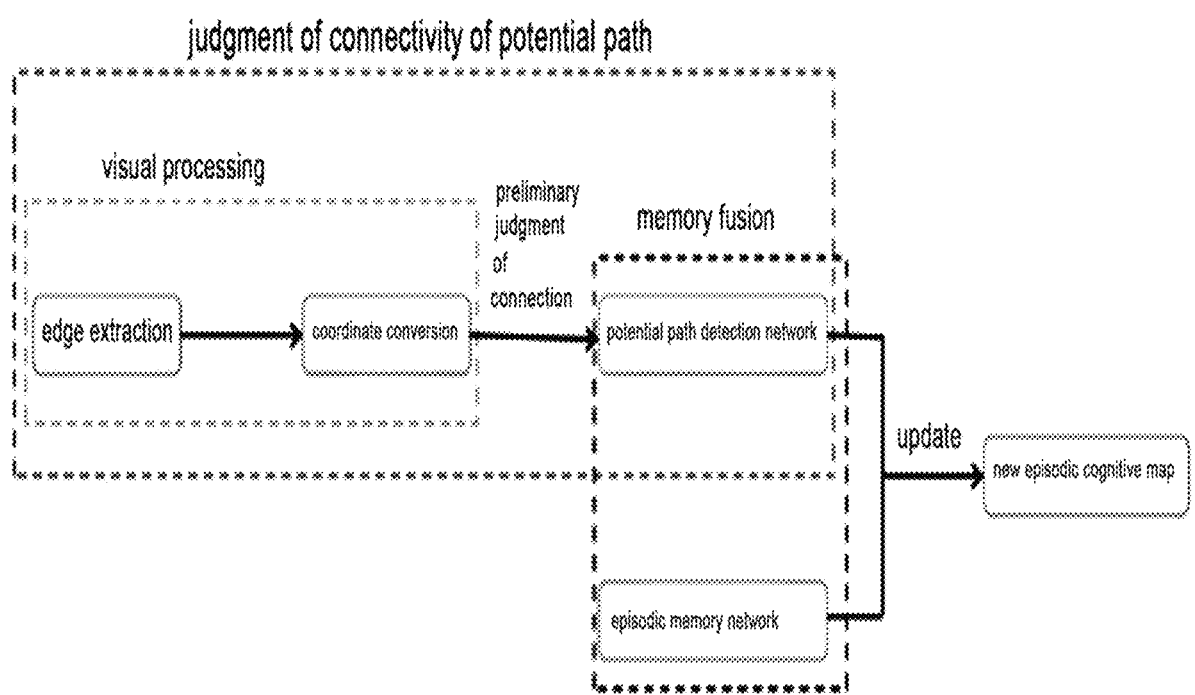
FIG. 1 is a schematic flow chart of a path planning method according to an embodiment of the present invention.

As shown in FIG. 1, one embodiment of the present invention provides a path planning method, and in the present embodiment, the path planning method is an episodic memory path planning method based on memory fusion, and the path planning method includes the following steps:

S1: establishing an empirical map and a corresponding episodic cognitive map using a RatSLAM algorithm based on an episodic memory model;

S2: extracting a road edge in a historical memory image with a Canny operator;

S3: performing conversion to a world coordinate system from a pixel coordinate system based on the road edge, and preliminarily judging connectivity according to slope of the road edge;

S4: continuously injecting energy into the potential path detection network according to continuous observation of a potential path, so as to further judge the road connectivity;

S5: fusing the detected potential path and the original episodic cognitive map, and correspondingly updating the empirical map; and S6: planning a path based on the updated episodic cognitive map.

Figure 2:
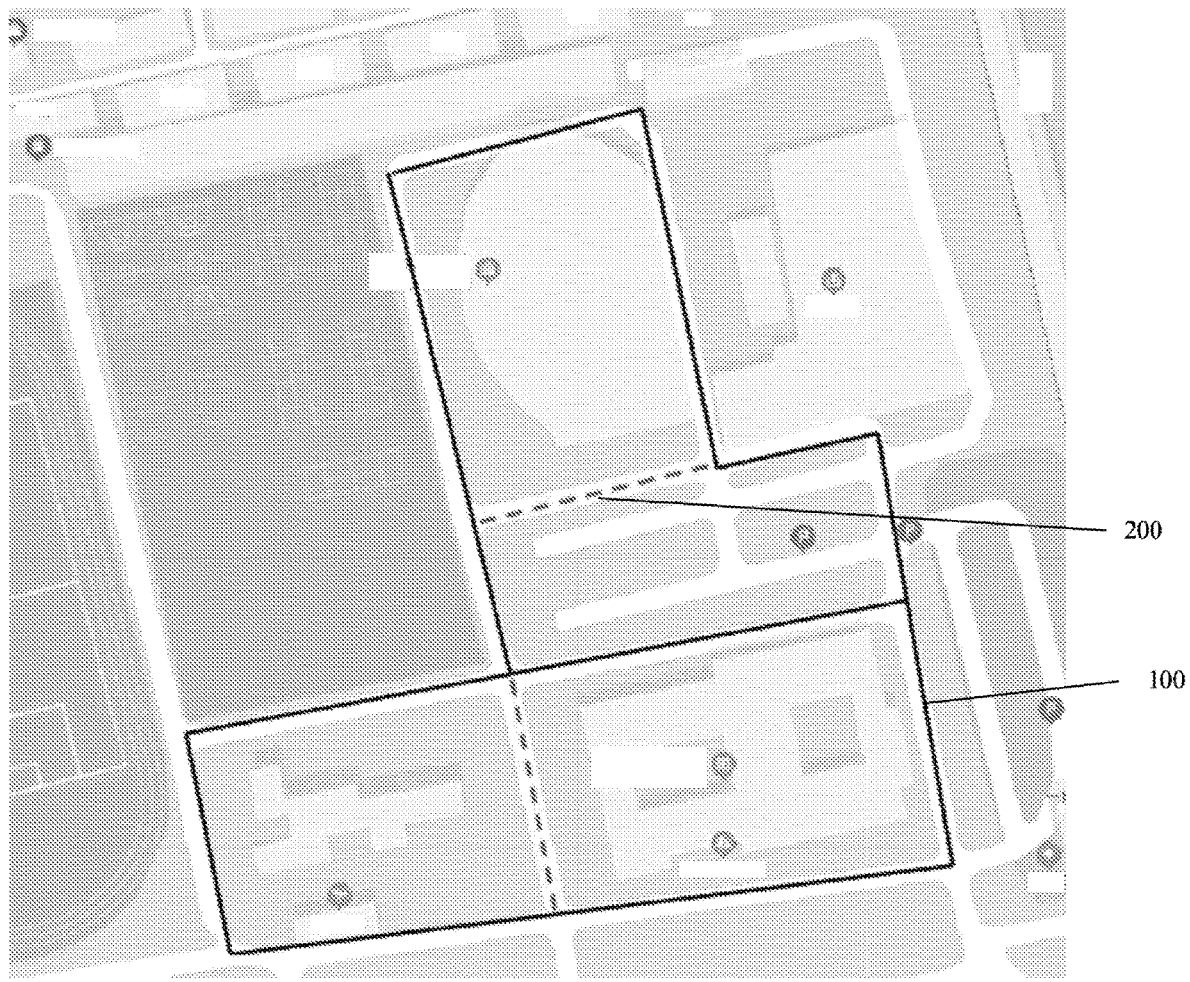
FIG. 2 is a schematic diagram of a motion track of a mobile robot.
Figure 3:
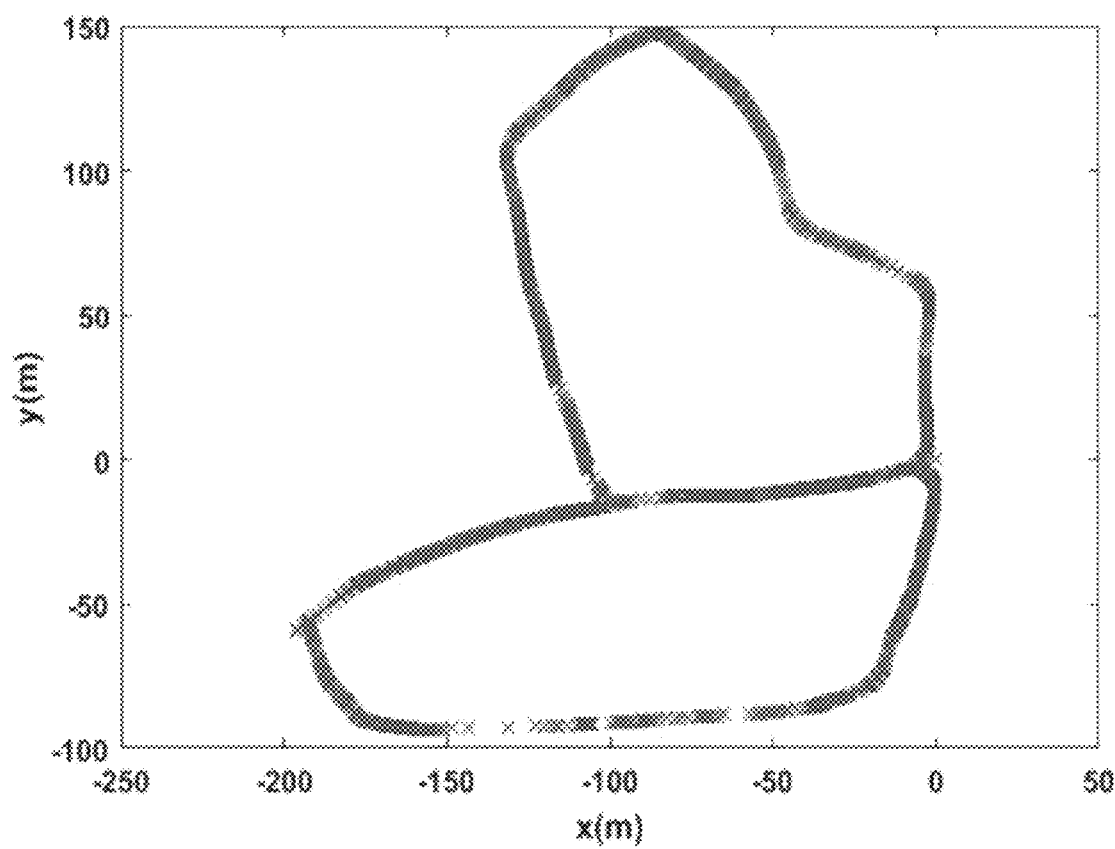
FIG. 3 is a schematic diagram of an empirical map established using a RatSLAM algorithm.

In step S1, the RatSLAM algorithm is a bionic navigation algorithm; the establishing an empirical map using a RatSLAM algorithm includes: establishing a two-dimensional empirical map using RGB image information collected by a monocular camera. The episodic memory model is a path planning algorithm; the episodic cognitive map is a two-dimensional incremental matrix and composed of a discrete limited event space and an event transition set. FIG. 2 shows a schematic diagram of a motion track 100 of a mobile robot, the dotted line representing a potential path 200. FIG. 3 shows a schematic diagram of the empirical map established using the RatSLAM algorithm.

Figure 4:
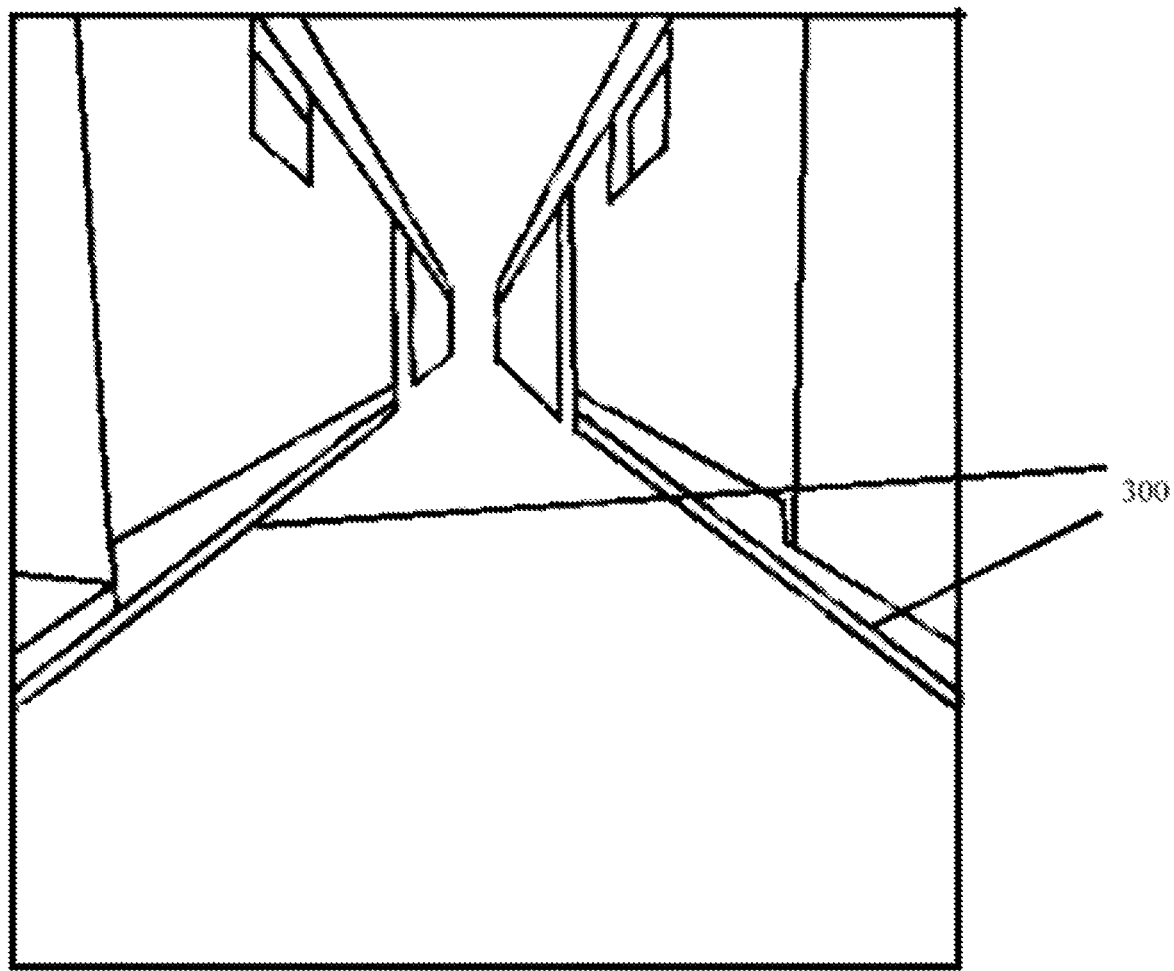
FIG. 4 is a schematic diagram of a road edge detection effect based on a Canny operator.

In step S2, the Canny operator is an edge extraction algorithm. FIG. 4 shows successful detection of a road edge 300 of a hallway based on the Canny operator. In the above, the Canny operator has high noise interference resistance, may adapt to different environments, has a good detection performance, and thus is selected as an edge detection algorithm. A detection result based on the Canny operator has rich environment structure edge information, but only the road edge information is required when the path is planned, and therefore, other redundant edges are required to be removed. Two longest edges in the image are detected by setting an appropriate detection region, thereby detecting the road edge information.

In step S3, the preliminarily judging connectivity according to slope of the road edge 300 includes: when an absolute value of a difference between the slope of the road edge 300 is less than a set threshold, preliminarily determining that there exists a possibility of connection between two points.

Figures 5, 6, 7:
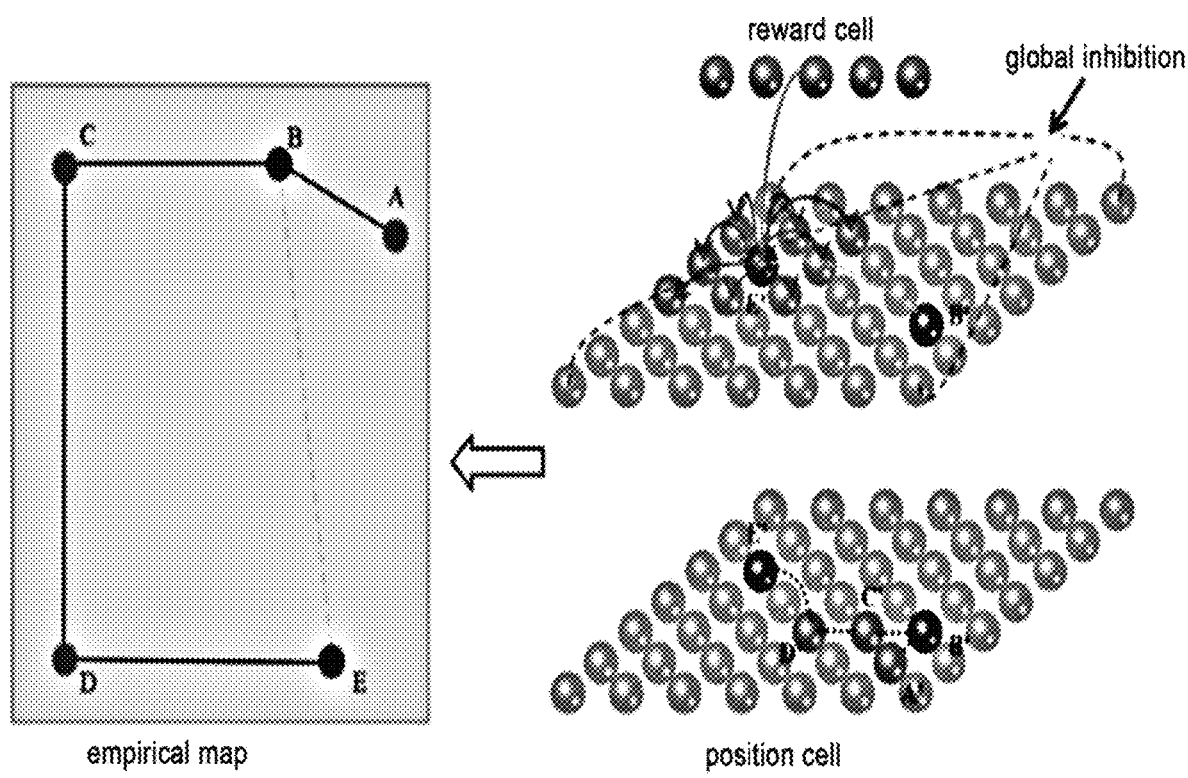
FIG. 5 is a schematic diagram of a potential path detection network.
FIG. 6 is a schematic diagram of an original episodic cognitive map obtained based on an episodic memory model.
FIG. 7 is a schematic diagram of an updated episodic cognitive map obtained after the potential path detection network is fused.

In step S4, the potential path 200 is a potential safe path, and the potential path detection network has a two-dimensional network structure proposed under inspiration of a continuous attractor network in a RatSLAM model, and is configured to simulate a process of judging whether roads are connected by living things. FIG. 5 shows a schematic diagram of the potential path detection network.

In step S6, the updated episodic cognitive map is a new map obtained by correcting an event transition weight in the original episodic cognitive map according to the detected potential path 200.

Figure 8:
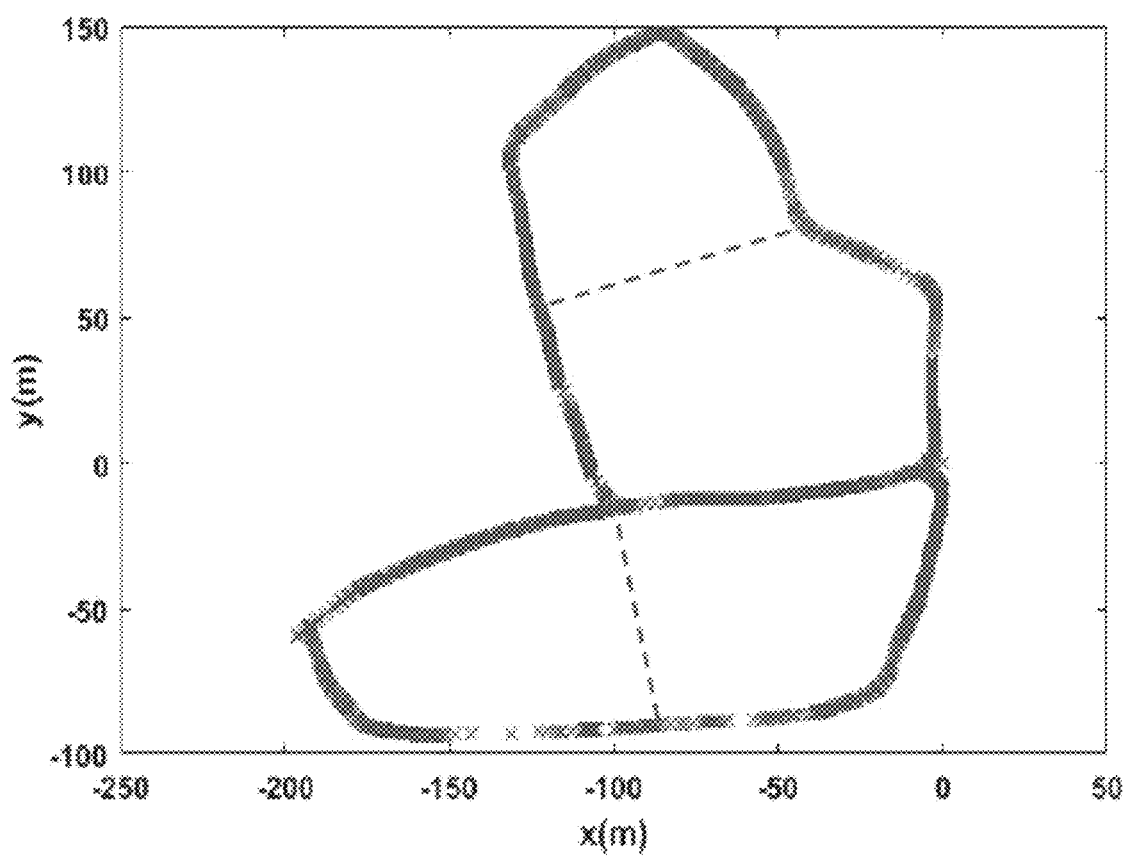
FIG. 8 is a schematic diagram of an updated empirical map generated with the RatSLAM algorithm based on the potential path detection network.

FIG. 6 shows a schematic diagram of the original episodic cognitive map obtained based on the episodic memory model in S1. FIG. 7 shows a schematic diagram of the updated episodic cognitive map obtained after the original episodic cognitive map and the potential path detection network are fused. FIG. 8 shows a schematic diagram of the updated empirical map generated with the RatSLAM algorithm based on the potential path detection network.

According to the embodiments of the present invention, the potential safe path in an environment is searched using the potential path detection network, and compared with an original episodic memory model only containing a track of the mobile robot in the past time and space, the episodic memory model after the potential path detection network is fused may plan the better path for the mobile robot.

Certainly, the above-mentioned embodiments are merely illustrative of the technical concepts and features of the present invention, and are intended to enable those skilled in the art to understand the contents of the present invention and implement the present invention, and not to limit the scope of the present invention. All modifications made in accordance with the spirit of the main technical solution of the present invention are intended to be covered by the protection scope of the present invention.

What is claimed is:

1. A path planning method for improving a navigation efficiency of a mobile robot, comprising the following steps:
providing the mobile robot;
establishing an empirical map and a corresponding episodic cognitive map using a RatSLAM algorithm based on an episodic memory model;
extracting a road edge in a historical memory image with a Canny operator;
performing conversion to a world coordinate system from a pixel coordinate system based on the road edge, and preliminarily judging connectivity according to slope of the road edge;
continuously injecting electric energy into a potential path detection network according to continuous observation of a potential path, so as to further judge the road connectivity;
fusing the detected potential path and the original episodic cognitive map, and correspondingly updating the empirical map;
planning a path based on the updated episodic cognitive map; and
fusing the path based on the updated episodic cognitive map to the mobile robot to improve the navigation efficiency of the mobile robot,
wherein the episodic memory model is a path planning algorithm;
the episodic cognitive map is a two-dimensional incremental matrix and composed of a discrete limited event space and an event transition set;
the preliminarily judging connectivity according to slope of the road edge comprises:
when an absolute value of a difference between the slope of the road edge is less than a set threshold, determining that there exists a possibility of connection between two points;
the potential path detection network has a two-dimensional network structure proposed under inspiration of a continuous attractor network in a RatSLAM model, and is configured to simulate a process of judging whether roads are connected by living things;
the updated episodic cognitive map is a new map obtained by correcting an event transition weight in the original episodic cognitive map according to the detected potential path.

2. The path planning method according to claim 1, wherein the RatSLAM algorithm is a bionic navigation algorithm, and the establishing an empirical map using a RatSLAM algorithm comprises: establishing a two-dimensional empirical map using RGB (Red, Green, and Blue) image information collected by a monocular camera.

3. The path planning method according to claim 1, wherein the Canny operator is an edge extraction algorithm.

* * * * *